United States Patent [19]

Maeda

[11] Patent Number: 4,603,361
[45] Date of Patent: Jul. 29, 1986

[54] MAGNETIC RECORDING AND REPRODUCING APPARATUS

[75] Inventor: Masaya Maeda, Kanagawa, Japan

[73] Assignee: Canon Kabushiki Kaisha, Tokyo, Japan

[21] Appl. No.: 630,659

[22] Filed: Jul. 13, 1984

Related U.S. Application Data

[63] Continuation of Ser. No. 312,326, Oct. 16, 1981, Pat. No. 4,481,551.

[30] Foreign Application Priority Data

Oct. 17, 1980 [JP] Japan ................. 55-145282

[51] Int. Cl.[4] ............................................. G11B 15/00
[52] U.S. Cl. .................................................... 360/85
[58] Field of Search ................ 360/83, 84, 85, 90, 360/93, 95, 96.1, 96.2, 96.3, 96.4

[56] References Cited

U.S. PATENT DOCUMENTS 2,717,282 9/1955 Reed ........................................ 360/90
3,719,364 3/1973 Hessland et al. ..................... 360/96.4
3,925,819 12/1975 Bachmann ............................. 360/106
4,481,551 11/1984 Maeda ..................................... 360/85

Primary Examiner—George G. Stellar
Attorney, Agent, or Firm—Toren, McGeady, Stanger, Goldberg & Kiel

[57] ABSTRACT

In the helical scan type magnetic recording and reproducing apparatus having the tape loading mechanism for training the magnetic tape against the wall of the tape guide drum including the magnetic head over the predetermined angle, an idler is arranged to selectively engage the supply reel pedestal and the takeup reel pedestal and is provided with a driving torque transmitting means for transmitting driving torque from a drive source to this idler wherein the aforesaid driving torque transmitting means is arranged to be switchable between a 1st mode where the driving torque of the drive source is directly transmitted to the idler and a 2nd mode where the driving torque of the drive source is transmitted through a slip torque transmission portion to the idler, and this switching is effected in relation to operation of the aforesaid tape loading mechanism.

6 Claims, 7 Drawing Figures

MAGNETIC RECORDING AND REPRODUCING APPARATUS

This is a continuation application of Ser. No. 312,326, filed Oct. 16, 1981, now U.S. Pat. No. 4,481,551 issued Nov. 6, 1984.

BACKGROUND OF THE INVENTION

1. Field of the Invention

This invention relates to helical scan type magnetic recording and reproducing apparatus having the so-called high speed search function, and more particularly to improvements of its reel pedestal drive mechanism.

2. Description of the Prior Art

In the magnetic recording and reproducing apparatus having the fast speed search function, that is, such mode that while, in the tape loading condition, the tape is running at a fast speed, reproduced images are obtained (hereinafter called "search mode"), to cope with the problem of regulating tape movement such that the tape may be wound at the increased speed, the required torque transferring system for the supply and takeup reel pedestals becomes very complex. For this reason, the conventional type of such systems has utilized either a separate motor for each reel pedestal with the electrical control of rotation of this motor, or a complicated mechanical clutch in order to accomplish the desired driving of the reel pedestal in each mode. The use of such system therefore, results in complex apparatus, constituting one of the necks in minimizing the bulk and size and weight thereof. Also the actuation control portion is, because of its requiring besides the actuating members for the ordinary fast feed and fast rewind, the provision of two actuating members adapted only to the search mode for the forward and reversed feeds respectively as in the separate form, increased in the complexity by that provision, and this calls for an increase in the space which the actuation control portion occupies. These problems becomes serious particularly when the compactness, light weight and good manageability are extremely important as in the portable type magnetic recording and reproducing apparatus.

In general, the search mode operates in such a manner that whilst the tape is being loaded, the capstan is driven to rotate as far higher a speed than when in the ordinary recording or reproducing mode, causing the tape to run in the forward or reversed direction at the increased speed. In this case, the one of the reels which takes up the tape (namely, the takeup reel when the tape runs in the forward direction, or the supply reel when the tape movement is reversed) must be driven through a slip-coupling means of prescribed appropriate transfer torque, while the number of revolutions is adjusted to slightly faster a value than the tape speed required when in the search mode. When in the ordinary rewind or fast feed mode, on the other hand, the supply reel or take up reel is connected directly to the output of the motor. Since, in this case, the winding torque increases and further the tape runs at the high speed, it is undesirable to permit the tape to remain in contact with the tape guide drum and other members such as the stationary head during that operation.

SUMMARY OF THE INVENTION

With the foregoing in mind, it is an object of the present invention to provide a magnetic recording and reproducing apparatus capable of search mode which is very simple in structure as compared with the conventional one.

Another object of the invention is to provide a magnetic recording and reproducing apparatus with the actuating member for the fast feed and fast rewind of the tape within the cassette being rendered possible to also serve as an actuating member for the search mode.

Still another object of the invention is to provide a magnetic recording and reproducing apparatus of simplified construction while still permitting an optimum winding torque to be obtained for a corresponding one of the various modes.

One of the features of the present invention is that the torque transferring means for transferring torque to the supply or takeup reel when in the fast rewind or fast wind mode is caused to change its operative position in response to loading of the tape so that with the tape loaded, when the actuating member for the fast rewind and fast wind mode is operated, the tape movement is regulated to suit the search mode.

That is, the present invention concerns with the helical scan type magnetic recording and reproducing apparatus having the tape loading mechanism for bringing the magnetic tape into contact around the tape guide drum over the predetermined angular distance in which drum is included the magnetic head and is to provide a magnetic recording and reproducing apparatus characterized in that an idler is provided as arranged to selectively engage the supply reel pedestal and takeup reel pedestal, and this idler is provided with driving torque transmitting means arranged to be switchable between a 1st operative position where driving torque of a drive source is transmitted directly to the idler, and a 2nd one where driving torque of the drive source is transmitted through a slip-coupling means to the idler, and that this switching is performed in relation to the operation of the aforesaid tape loading mechanism.

Such features enable a tape reel drive system for the search mode with the tape loaded and for the fast wind and fast rewind modes with the tape retracted within the cassette (unloaded) to be constructed in an extremely simple form and to operate with a high reliability, and a single actuating member to suffice for selection of these modes.

DESCRIPTION OF THE PREFERRED EMBODIMENTS

The present invention will next be described in connection with an embodiment thereof by reference to the drawings.

Figure 1:
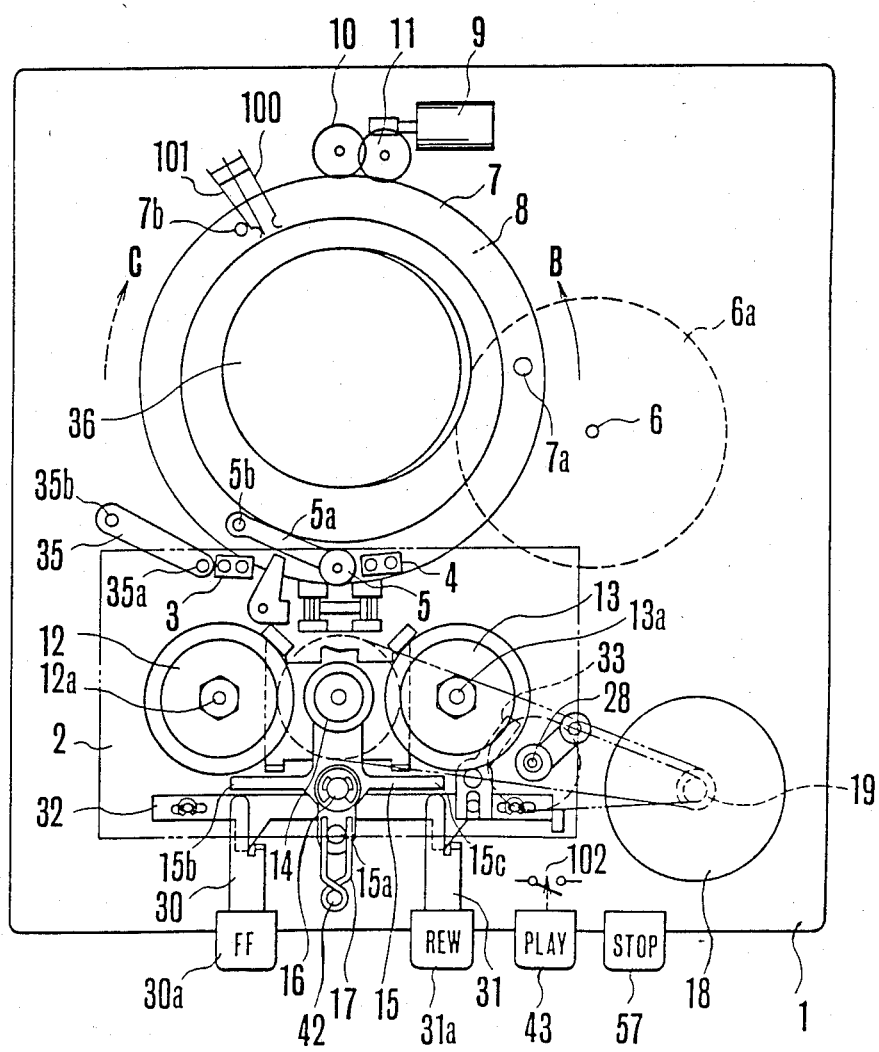
FIGS. 1 and 2 are plan views of an embodiment of a magnetic recording and reproducing apparatus according to the present invention in the loaded and unloaded positions respectively.
Figure 2:
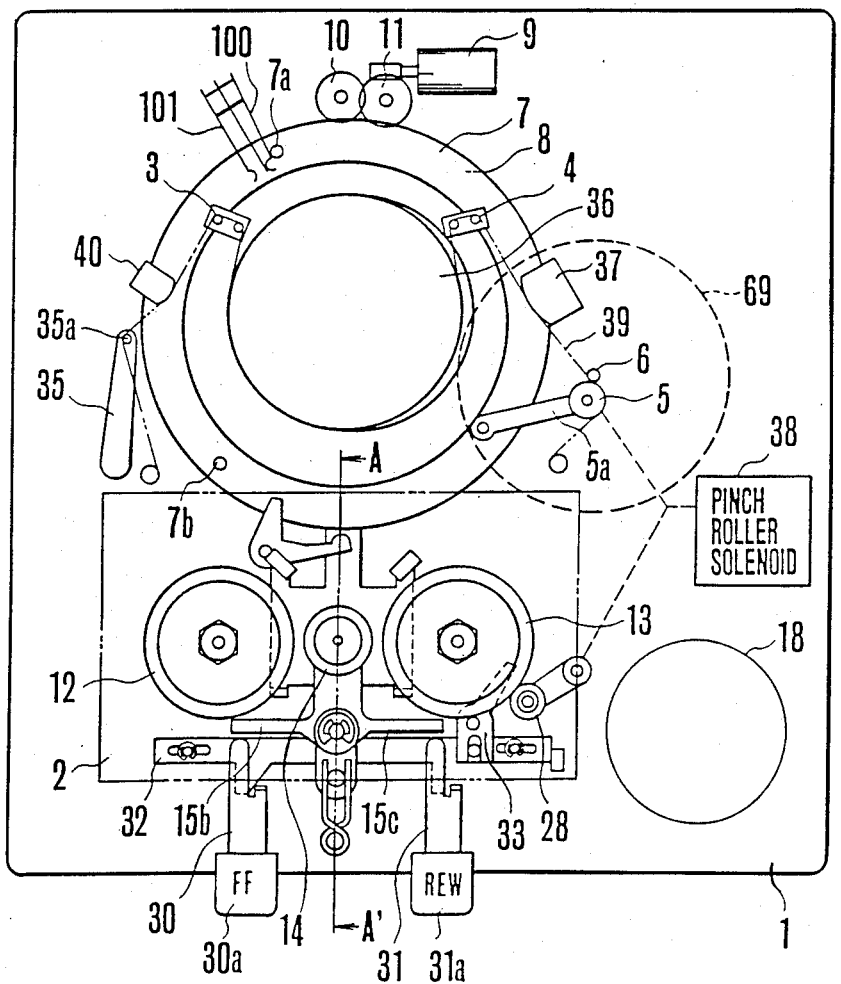

FIGS. 1 and 2 illustrate a magnetic recording and reproducing apparatus employing one form of the invention with FIG. 1 in an operative position before the tape loading and FIG. 2 in an operative position after the completion of the tape loading. The tape loading method employed in this apparatus is substantially the so-called "M loading method." In FIG. 1, a tape cassette 2 is put in the illustrated position as guided by a cassette attachment device (not shown), where supply and takeup reels (not shown) are fitted onto rotary spindles of turn tables 12 and 13 respectively. Though not shown in the drawings, a front panel of this cassette (2) casing is provided with an apertured portion through the wall thereof to expose a magnetic tape, and a bottom panel of the aforesaid casing is provided with cutout portions formed therein through which tape pull means such as those denoted by 3 and 4 freely move. Such construction of tape cassette 2 is known in the art, and no more detailed explanation is given here.

When the aforesaid cassette 2 has taken the prescribed position illustrated in FIG. 1, the tape pull members 3 and 4, a pinch roller 5 and a tape pull pin 35a are inserted into and seated in an inside space of the tape behind the aforesaid aperture portion of cassette casing 2. The aforesaid tape pull member 4 and pinch roller 5 are rotatably mounted on a loading ring 7, and the aforesaid tape pull member 3 also rotatably on another loading ring 8. Again, the tape pull pin 35a is carried on a tape pull arm 35. The aforesaid loading rings 7 and 8 are positioned in superimposed relation around a tape guide drum 36, and are driven by a loading motor 9 to turn in mutually opposed directions. That is, the aforesaid loading rings 7 and 8 have geared portions formed in the peripheries thereof, which mesh with pinions 10 and 11 respectively. These pinions 10 and 11 are also engaged with each other, and the pinion 11 is connected to the output shaft of the motor 9. Therefore, the loading rings 7 and 8 are caused to rotate always in opposite directions to each other as the motor 9 rotates in either direction. When loading the tape, the aforesaid loading ring 7 is rotated in a direction indicated by arrow B, and the other loading ring 8 in a direction indicated by arrow C. Such movement of the loading rings 7 and 8 causes the aforesaid tape pull members 4 and 3 to move in their predetermined paths defined by guide means (not shown), whereby the tape 39 is pulled out of the interior of the cassette 2 and then brought into training engagement against the wall of the tape guide drum 36 over a predetermined angular distance of about 180°. It is noted that the interior of the aforesaid tape guide drum 36 incorporates a rotary head (not shown). This rotary head functions to record video signals on the tape contacting with the guide drum 36 and also to reproduce the video signals recorded on the tape.

The aforesaid pinch roller 5 is rotatably mounted on the free end of a lever 5a which is pivotally mounted at a pin 5b on the loading ring 7 and, as the aforesaid rotative movement of loading ring 7 in B direction goes on, the pinch roller 5 is moved in a prescribed path defined by a guide means (not shown), while bringing the tape 39 into contact with a sound and control head 37 illustrated in FIG. 2, finally reaching a position near a capstan 6. Then, the completion of loading is detected to actuate a pinch roller solenoid 38, thereby the pinch roller 5 is pressed against the capstan 6 with the tape 39 sandwiched therebetween. It is noted that responsive to actuation of the aforesaid pinch roller solenoid 38, an idler 28 which is driven to rotate by an endless belt trained over an output shaft 19 of a motor 18 is brought into driving connection with the takeup reel turn table 13 so that motion of the motor 18 is transmitted to the takeup reel turn table 13, thus driving the takeup reel turn table 13 to rotate. It is also noted that the output shaft 19 of this motor 18 is drivingly connected through an endless belt (not shown) to a fly wheel 6a of the capstan 6, thus driving the capstan to rotate.

The aforesaid tape pull arm 35 is pivotally mounted at a pin 35b on a base plate 1, and, as the aforesaid loading ring 8 rotates, moves to a tape guiding position illustrated in FIG. 2 where the tape 39 is pressed against an overall width eraser head 40 and where in cooperation with a back tension control mechanism (not shown), it exerts a braking action on the supply reel turn table 22 to impart into the tape 39 a predetermined a back tension.

It is noted that formed on the aforesaid loading ring 7 are also actuating projections 7a and 7b. These projections 7a and 7b actuate a loading completion detecting switch 100 and an unloading completion detecting switch 101 respectively, and are arranged in such positions that when the loading ring 7 has turned to the terminal end of loading movement, or to the position illustrated in FIG. 2, or when to the opposite terminal end of movement, or to the position illustrated in FIG. 1, the aforesaid switch 100 or 101 is pushed by the projection 7a or 7b to the closed position respectively.

Figures 3, 4:
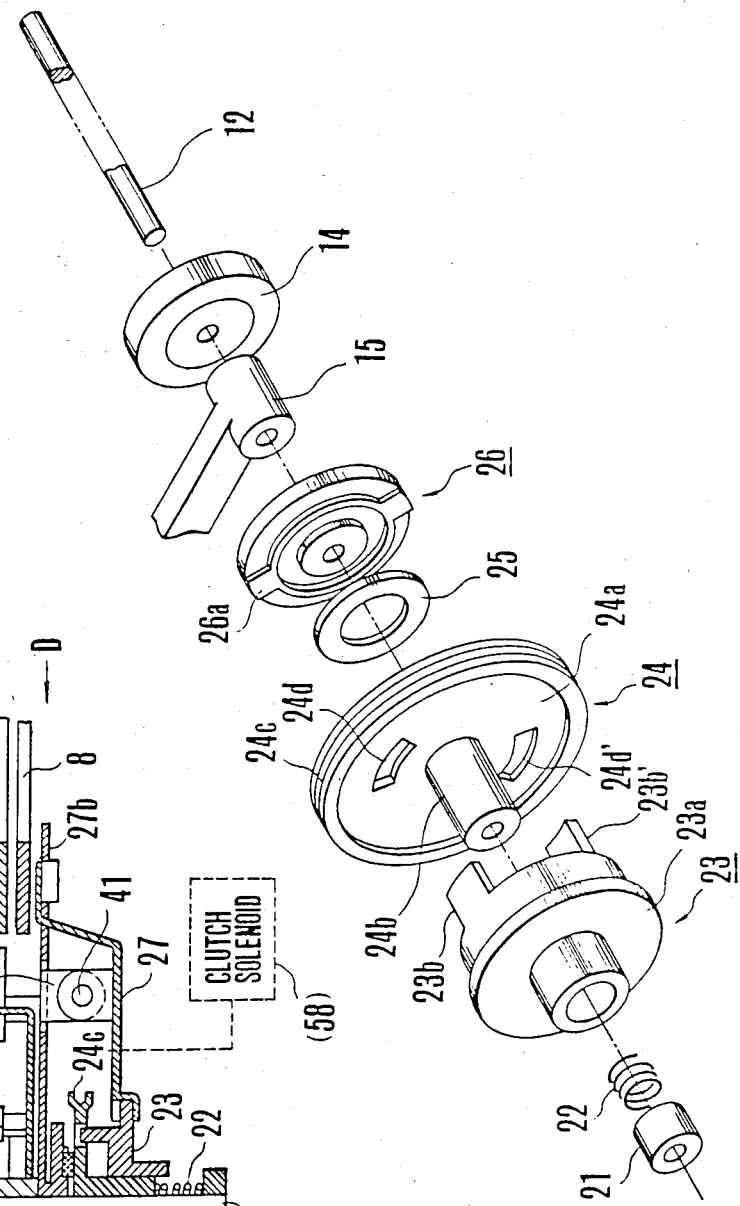
FIG. 3 is a fragmentary sectional view taken along line A—A' of FIG. 2.
FIG. 4 is an exploded perspective view of the driving torque transferring mechanism.

In the aforesaid apparatus, driving of the reel table 12 or 13 when in the fast feeding mode is carried out by an idler 14 normally arranged at an almost center of the distance between the supply and takeup reels 12 and 13 rotatably fitted on spindles 12a and 13a planted on the base plate 1 after it is pressed against the takeup side reel table 12 or 13. The aforesaid idler 14 of which the details are shown in FIGS. 3 and 4 is fixedly mounted on the upper end of an idler shaft 20 which is rotatably supported by an idler table 15. Affixed to this idler shaft 20 is an intermediate ring 26, the inner side of the lower surface of which a slip member 25 is adhered to, and its outer side of which is provided with an engagement projected portion 26a. And below the intermediate ring 26 of the aforesaid idler shaft 20 is a drive pulley 24 rotatable relative to the shaft 20 and slidingly movable in thrust directions. This drive pulley 24 consists of an annular flanged portion 24a and a cylindrical boss portion 24b. Over the outer periphery of the annular flanged portion 24 is trained a drive belt (not shown) so that driving torque of the capstan motor 18 is transferred. Therefore, the outer peripheral edge of the flanged portion 24a has a recessed portion 24c in which the drive belt is snugly fitted. Also the aforesaid flanged portion 24a has a pair of slots 24d and 24d' formed in predetermined positions. A clutch disc 23 is rotatably and slidingly fitted on the outer diameter of the aforesaid boss portion 24b and is provided with a pair of extensions 23b and 23b' portion thereof which are freely fitted in the aforesaid slots 24d and 24d' formed in the flanged portion 24a of the aforesaid drive pulley 24. Again, this clutch disc 23 has an integral flange 23a on the outer periphery thereof, and this flange 23a is sandwiched by a forked portion of a clutch changeover plate 27 to be more fully described later. In the loaded position shown in FIG. 3, the clutch disc 23 is held by the clutch changeover plate 27 in the illustrated position. It is noted that fixed to the lower end of the aforesaid idler shaft 20 is a stopper sleeve 21, and a coil spring 22 inserted between this sleeve 21 and the lower end of the boss 24b of the aforesaid drive pulley 24 urges the aforesaid drive pulley 24 in an upward direction as viewed in FIG. 3, that is, toward the intermediate ring 26. Therefore, the drive pulley 24 is normally pressed against the slip member 25 provided on the lower surface of the intermediate ring 26. When in the position illustrated in FIG. 3, therefore, rotation of the drive pulley by the capstan motor 18 is transmitted through the slip member 25 to the idler shaft 20, thereby the idler 14 is driven to rotate.

Figure 5:
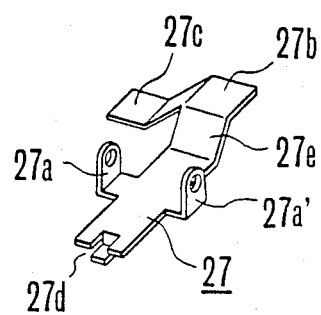
FIG. 5 is a perspective view of the clutch changeover plate.
Figure 6:
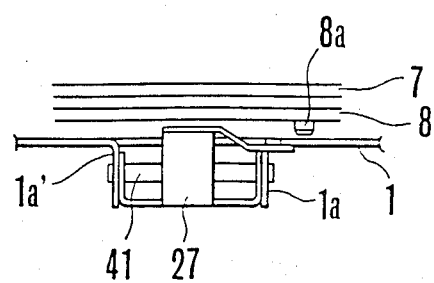
FIG. 6 is a side elevational view looking from a direction indicated by arrow D in FIG. 3.

The clutch changeover plate 27 functions to move the aforesaid clutch disc 23 slidingly on the ilder shaft 20 in vertical directions, and, as illustrated in FIG. 5, is provided with a pair of mount arms 27a and 27a'. These mount arms 27a and 27a' have respective penetration holes formed therein and, as shown in FIG. 6, these penetration holes and ones in a pair of mount portions 1a and 1a' formed in predetermined positions of the base plate 1 by bending off are penetrated by a common mount pin 41 so that the plate 27 is pivotally mounted on the lower surface of the base plate 1. One end portion of this clutch changeover plate 27 is bent off in part to a letter-L shape and forms a forked portion 27d appearing to be of a letter-U shape as viewed sidewards. And this formed portion 27d receives the flange 23a of the aforesaid clutch disc 24 slidably. The opposite end portion of the clutch changeover plate 27 is stepped up by a portion 27e toward the base plate 1 to form an actuating area 27b which takes a position beneath the aforesaid loading ring 8. In one of the side portions of this actuating area 27b is formed a stopper portion 27c. It is noted that the clutch changeover plate 27 is urged by a spring (not shown) to turn in a counter clockwise direction as viewed in FIG. 3, and this rotation is limited by the aforesaid stopper portion 27c abutting on the base plate 1. Also formed in the lower portion of the aforesaid loading ring 8 at a position corresponding to the unloading completion is an actuating projection 8a as shown in FIG. 6. When the loading ring 8 is in the unloading position, this actuating projection 8a contacts with the actuating area 27b of the clutch changeover plate 27 and then pushes this, thereby the clutch changeover plate 27 is turned in a clockwise direction as viewed in FIG. 3 against the bias force of the spring. Such clockwise movement of this clutch changeover plate 27 causes the clutch disc 23 to move upwards by the forked portion 27d engaging the flange 23a so that the extensions 23b and 23b' freely fitted in the penetration holes 24d and 24d' of the dirve pulley 24 engage with the engagement projections 26a formed in the intermediate ring 26, and the driving torque of the drive pulley 24 by the capstan motor 18 is directly transmitted to the intermediate ring 26.

It is noted that the aforesaid idler table 15 is rotatably supported on a shaft 16 planted on the base plate 1 and is urged to the central position by a spring 17 affixed to a pin 42 planted on the base plate 1 and engaging a projected portion 15a formed in the idler table 15 in sandwiching manner, thus normally taking an almost central point in position of the two reel tables 12 and 13. It is noted that formed in the idler table 15 are a pair of armed portions 15b and 15c symmetric to each other with respect to the shaft 16, and these armed portions 15b and 15c are arranged in opposition to a fast feed control member 30 and a fast rewind control member 31 which are slidingly moved by pushing a fast feed button 30a and a fast rewind button 31a respectively. Therefore, responsive to pushing operation of the fast forward button 30a, the aforesaid armed portion 15b is acted on which in turn causes the idler table to turn in a clockwise direction until the idler 14 engages the takeup reel table 13. Likewise responsive to depressing of the fast rewind button 31a, the aforesaid armed portion 15b is acted on which in turn causes the idler table to turn in a counter-clockwise direction until the idler 14 engages the supply reel table 12.

It is noted that in FIG. 1, 32 is a slide plate arranged upon actuation of the fast feed control member 30 and fast rewind control member 31 to move to the left as viewed in the figure. Such leftward movement of this slide plate 32 causes an actuating lever with its one end engaging therewith to turn in a clockwise direction, while the opposite end is displaced to move the aforesaid takeup idler 28 away from the takeup reel table 13. Also responsive to actuation of the aforesaid fast feed control member 30 and fast rewind control member 31, switches 103 and 104 illustrated in FIG. 7 are turned on.

Figure 7:
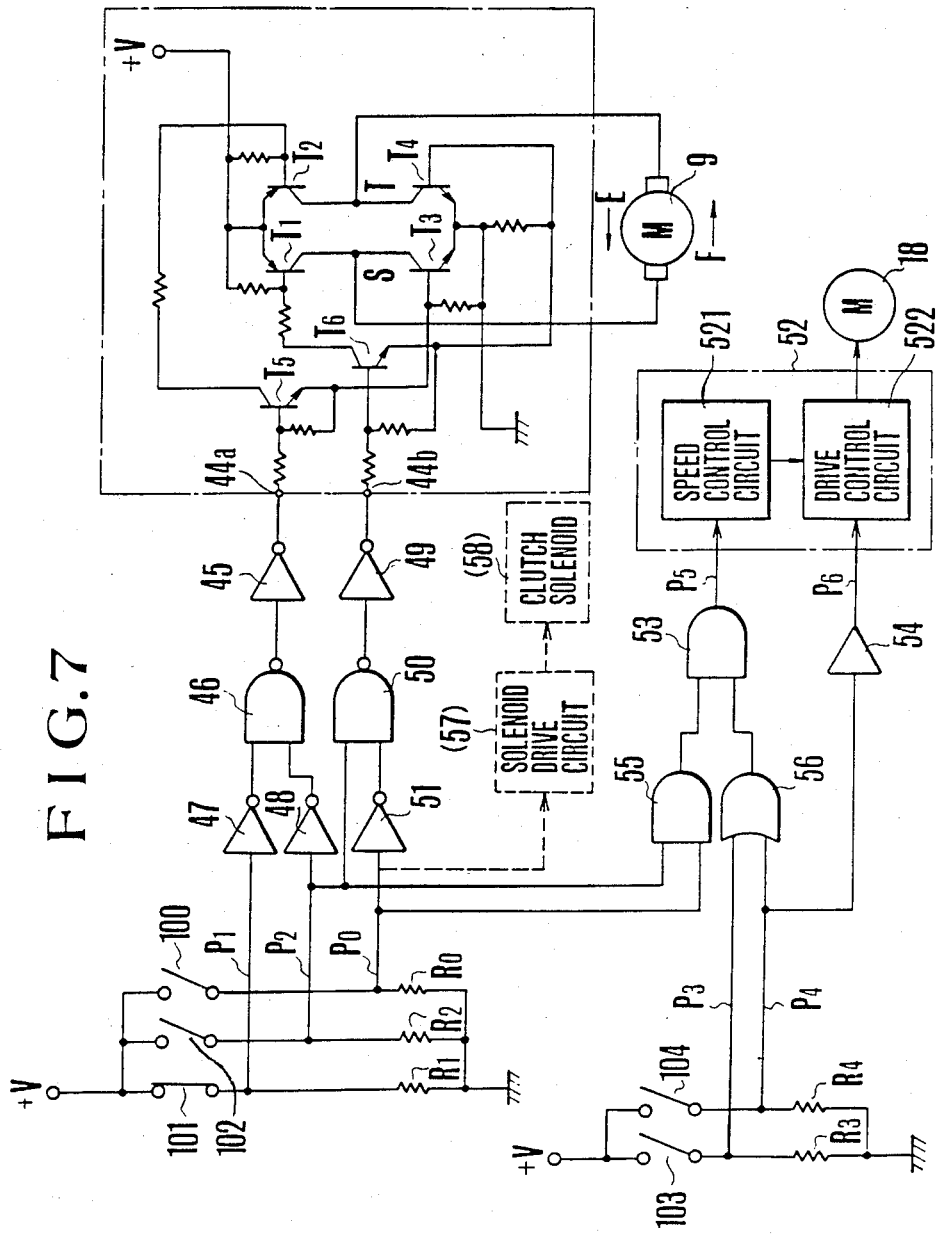
FIG. 7 is a schematic diagram of the drive circuit of the loading motor and capstan motor.

FIG. 7 illustrates a drive circuit for the loading motor 9 and capstan motor 18 in a position where unloading is completed. In the drawing, 100 is the above-described loading completion detecting switch; 101 is the aforesaid unloading completion detecting switch; 102 is a switch arranged to turn on when a play button 43 illustrated in FIG. 1 is depressed; 103 is a switch arranged to turn on when the fast feed button 30a is depressed; and 104 is a switch arranged to turn on when the fast rewind button 31a is depressed. These switches 100 to 104 are formed to normally open microswitches, each of which is turned on (that is, conducting) when actuated, and off (that is, non-conducting) when de-actuated. And, the aforesaid switches 100 to 104 are connected at one terminals thereof to a positive voltage source V and at the other terminals to the circuit earth through respective resistors R0 to R4, and produce outputs P0 to P4 at those of the terminals which are connected to the resistors R0 to R4 respectively. Therefore, these outputs P0 to P4 take high level when the corresponding switches 100 to 104 are actuated, or closed, and low level when de-actuated or opened. The aforesaid loading motor 9 and capstan motor 18 are direct current motors. Drive of the loading motor 9 is controlled by a circuit 44. This drive control circuit 44 has control terminals 44a and 44b. And, when a control signal supplied to the first control terminal 44a is of high level, and a control signal supplied to the second control terminal 44b is of low level, a drive current is allowed to flow through the loading motor 9 in a direction indicated by arrow E. When the control signal supplied to the control terminal 44a is of low level, and the control signal supplied to the control terminal 44b is of high level, a drive current is allowed to flow through the motor 9 in a direction indicated by arrow F. In more detail, the aforesaid drive control circuit 44 is constructed, for example, as shown in the figure, with a pair of PNP transistors T1 and T2 with their emitters connected to each other, and pair of NPN transistors T3 and T4 with their emitters connected to each other, these pairs constituting a bridge circuit having a junction point S of the transistors T1 and T3 and a junction point T of the transistors T2 and T4 between which is connected the winding of the motor 9. Then, these transistors T1 to T4 are made switchable as are controlled by a pair of NPN transistors T5 and T6. That is, the base of the aforesaid transistor T5 is connected through a resistor to the aforesaid control terminal 44a so that when this transistor T5 is ON, the aforesaid transistors T2 and T3 are rendered conducting. Also the base of the transistor T6 is connected through a resistor to the aforesaid control terminal 44b so that when this transistor T6 is ON, the aforesaid transistors T1 and T4 are rendered conducting. Such motor drive circuit is known to those skill in the art, and no more explanation is given here.

The aforesaid control terminal 44a is supplied through an inverter 45 with an output of NAND circuit 46 which is supplied with the outputs P1 and P2 of the switches 101 and 102 through inverters 47 and 48 respectively. The control terminal 44b is supplied through an inverter 49 with an output of an NAND circuit 50 which is supplied with the output P2 of the switch 102 and through an inverter 51 with the output P0 of the switch 100. 52 is a drive circuit for the capstan motor 18, comprising a speed control circuit 521 and a drive control circuit 522. The speed control circuit 521 functions dependently of the control signal to set the number of revolution of the capstan motor 18 to either a first value N1 for the capstan 6 running the tape 39 at the ordinary speed, or a second value N2 for the capstan 6 running the tape 39 at the increased speed in the search mode. As the control signal is supplied the output P5 of an AND circuit 53. And, this output P5 of AND curcuit 53 when of low level results in setting the number of revolutions of the capstan motor 18 to the 1st value N1, and when of high level, results in setting to the 2nd value N2. The drive control circuit 522 functions dependently of the supplied control signal to control the direction of rotation of the capstan motor in such a manner that the capstan 6 drives the tape to move either in the ordinary running direction (hereinafter called "forward direction"), or in the opposite direction thereto (hereinafter called "reversed direction"). As the control signal is supplied the output P6 of an amplifier 54. And, when the output P6 of the amplifier 54 is of low level, the capstan motor is driven to rotate in the forward direction, and when of high level, it is driven to rotate in the reversed direction. Such drive control circuit 522 can readily be constructed as, for example, being similar to the aforesaid loading motor 9 drive control circuit 44 and comprising a bridge circuit of four transistors of which the switching is controlled depending upon the control signal. Here, therefore, its details are no more explained. Also the aforesaid speed control circuit 521 can readily be constructed as, for example, in such form that the intensity of current flowing through the capstan motor 18 is changed depending upon the control signal. Particularly where the aforesaid drive control circuit 522 is constructed with the use of the four-transistorized bridge circuit as has been mentioned above, the voltage of the electrical power source may be changed in magnitude depending upon the control signal P5. Therefore, its details are no more described here.

It is noted that the aforesaid AND circuit 53 is supplied through an AND circuit 55 with the AND output of the outputs P0 and P2 of the switches 100 and 102, and through an OR circuit 56 with the OR output of the outputs P3 and P4 of the switches 103 and 104, and the aforesaid amplifier 54 is supplied with the output P4 of the switch 104.

Also, in the figure, dashed line circuit blocks 57 and 58 represent a solenoid drive circuit and a clutch solenoid to be driven by this drive circuit respectively. These circuits 57 and 58 are added in an alternate embodiment where when to actuate the aforesaid clutch changeover plate 27, instead of using the actuating projection 8a formed in the lower surface of the loading ring 8, use is made of the clutch solenoid 58. Applied to the aforesaid solenoid drive circuit 57 as a control signal is the output P0 of the switch 100. And this drive circuit 57 operates in such a manner that when the output P0 of the switch 100 is of high level, the clutch solenoid 58 is driven.

Also, in FIG. 7, though not particularly shown, there is an additional circuit responsive to depression of any one of the play button 43, fast forward button 30a and fast rewind button 31a for supplying drive voltage to the drive circuit 52 for the capstan motor 18, thereupon the capstan motor is driven to rotate with the selection of the speeds and directions depending upon the control signals P5 and P6.

The operation of the apparatus of such construction is as follows: In case where the tape is unloaded as shown in FIG. 1, the aforesaid clutch changeover plate 27 is in the pushed position with its actuating area 27b engaging the actuating projection 8a formed in the bottom surface of the loading ring 8. Therefore, the clutch changeover plate 27 takes the clockmost position illustrated in FIG. 3 against the bias force of a spring (not shown). Therefore, the clutch disc 23 of which the flange 23a is clamped by the forked portion 27d of the clutch changeover plate 27 is held in the lifted position where the extensions 23b and 23b' of the clutch disc 23 pass through the respective freely fitted holes 24d and 24d' to engage the lugs 26a of the intermediate ring 26. That is, in the tape-unloaded position, the driving torque of the motor 18 is connected directly to the idler 14 by means of the drive pulley, clutch disc 23 and intermediate ring 26. Therefore, with this drive system, when the fast forward or fast rewind button 30a or 31a is pushed to press the idler 14 against the takeup reel tape 13 or supply reel table 12, the tape runs at the high speed within the cassette 2 under the direct driving action of the motor 18.

When to switch the aforesaid apparatus to the reproducing mode, the operator needs to push the PLAY button 43. That is, when the PLAY button 43 is pushed, this PLAY button 43 is locked in the pushed position by a lock mechanism (not shown), and the switch 102 is held in ON position, thereby its output P2 is changed from low to high level. Since, at this time, the loading completion detecting switch 100 is OFF with its output P0 of low level, the inputs of the NAND circuit 50 are all of high level, causing the output of the NAND circuit 50 to change to low level. As a result, a signal of high level is applied to the control terminal 44b of the drive control circuit 44 for the loading motor 9. In this case, the other control terminal 44a is supplied with a signal of low level, since the output P2 of the switch 102 is of high level and therefore one of the inputs of the NAND circuit 46 is of low level which causes production of an output of high level. Therefore, the motor 9 is energized by current flowing in F direction from the drive control circuit 44 and starts to rotate. As a result, the aforesaid loading ring 7 is driven through the gear 11 to turn in B direction in FIG. 1, while the aforesaid loading ring 8 is driven through the gears 10 and 11 to turn in O direction in FIG. 1. As the rings 7 and 8 turns in the opposite directions to each other, the tape pull out means 4 and 3 while exerting pull on the tape 39 are moved in the predetermined paths, thus starting to train the tape over the wall of the tape guide drum 36. At the same time, the aforesaid unloading completion detecting switch 101 is released from depression by the actuating projection 7b formed on the loading ring 7, thereby its output P1 is changed from high to low level. Then, when the aforesaid loading rings 7 and 8 have turned the predetermined angular distance to complete the loading of the tape 39, the actuating projection 7a on the loading ring 7 closes the aforesaid loading completion detecting switch 100, thereby its output P0 is changed from low to high level. Therefore, one of the inputs of the NAND circuit 50 becomes low level, so that the output of the NAND circuit 50 changes from low to high level. As a result, a signal of low level is applied to the control terminal 44b of the drive control circuit 44. Since, at this time, the output P2 of the switch 102 is of high level, as has been mentioned above, the signal of low level appears on the control terminal 44a. Therefore, the drive control circuit 44 stops the loading motor 9 from further rotation. As a result, rotation of the loading rings 7 and 8 stops. As the aforesaid loading of the tape 39 is completed, the pinch roller 5 is brought into pressing contact against the capstan by means (not shown) and the tape 39 starts to run at the ordinary speed in the reproducing mode. In synchronism with the reach of the pinch roller 5 to the capstan 6, the takeup idler 28 is caused by a drive mechanism (not shown) to contact with the takeup reel table 13. Then, the takeup reel table 13 is driven to rotate with its reel starting to wind the tape 39. It is in this state that the electrical signals recorded on the tape 39 are read out by the rotary head (not shown) arranged in the interior of the tape guide drum 36 and an electronic circuit for reproduction (not shown), then undergo a predetermined signal processing and then is applied to a display device (not shown) where the recorded images are reproduced. That is, the apparatus takes the reproducing position. In this position, the actuating area 27b of the clutch changeover plate 27 is taken out of engagement with the actuating projection 8a formed in the lower surface of the loading ring 8, and the clutch changeover plate 27 is held in the position illustrated in FIG. 3 under the action of a bias spring (not shown). As a result, the clutch disc 23 is held in the position where its extensions 23b and 23b' do not engage the projections 26a formed in the intermediate ring 26. For this reason, the driving torque of the motor 18 is transmitted through the drive pulley 24, slip member 25 and intermediate ring 26 to the idler 14.

Whilst the aforesaid reproducing is under progression, when the fast forward button 30a or the fast rewind button 31a is depressed, the idler 14 engages either the takeup reel table 13, or the supply reel table 12, and at the same time the slide plate 32 is moved to the left as viewed in FIG. 1, causing the actuating lever 33 to turn in the clockwise direciton which in turn causes the takeup idler 28 to move away from the takeup reel table 13. Along therewith, the switch 103 or switch 104 is turned on to produce the output P3 or P4 of high level. Responsive to this, the OR circuit 56 changes its output from low to high level. Since, at this time the aforesaid switches 100 and 102 have their outputs P0 and P2 both of high level, the inputs of the AND circuit 53 are all of high level, and the output P5 of the AND circuit 53 becomes high level. As a result, the control signal of high level is applied to the speed control circuit 521, thereby the capstan motor 18 is speeded up to the 2nd number of revolutions N2 for the capstan 6 running the tape 39 at the speed for the search mode. In this case, the direction of rotation of the captstan motor 18 as the fast rewind button 31a is pushed to turn on the switch 104, is reversed by the drive control circuit 522. Otherwise, it is driven in the forward direction. Thereupon, the tape 39 is impelled by the pinch roller 5 and capstan 6 to run at the increased speed above the ordinary reproducing tape speed in the forward or reversed direction. At this time, as has been described above, the one of the reel tables which takes up the tape, namely when in the fast forward, the takeup reel table 13, or when in the fast rewind, the supply reel table 12 engages the idler 14, and is driven to rotate by the idler 14. In this connection, it should be pointed out that the idler 14 because of its being rendered to cooperate with the slip member 25 in the transfer of the driving torque of the capstan motor 18 therethrough enables that reel to wind the tape which is being fed at far faster a speed than the ordinary reproducing speed smoothly thanks to the properly adjusted torque.

When to stop the apparatus from the aforesaid reproducing, the STOP button 57 is depressed. Such depression of the STOP button 57 causes release of the PLAY button 43 from the locking connection by a lock release mechanism (not shown), thereby the switch 102 is turned off to change its output P2 from high to low level. As a result, the control signal appearing at the control terminal 44a of the drive control circuit 44 for the loading motor 9 changes from low to high level. Since, at this time, the output P2 of the aforesaid switch 102 is of low level, the control signal appearing at the control terminal 44b is of low level. As a result, the drive control circuit 44 gives off current flowing through the motor 9 in the direction indicated by arrow E. In this case, the direction of current flow to the motor 9 is opposite to that when in the loading time, that is, the F direction, so that the motor 9 is driven in the reversed direction to that when in loading time. Therefore, the loading rings 7 and 8 starts to turn in the reversed directions to those when in the loading time. Also in synchronism with the start of the movement of the loading rings 7 and 8, a control means (not shown) moves the pinch roller 5 away from the capstan 6. In connection with this movement of the pinch roller 5, the takeup idler 28 is also moved away from the takeup reel table 13. At the same time, the loading completion detecting switch 100 is freed from the pressure of the actuating projection 7a of the loading ring 7, and is turned off, thereby its output P0 is changed from high to low level.

As the loading rings 7 and 8 are turning in the unloading direction, the tape pull out means 4 and 3 moves in the reversed directions to those when in the loading time, permitting the tape 39 to be retracted into the interior of the cassette 2. In this case, the supply reel table 12 winds up the slack loop of the tape 39 as motion of the loading ring 8 is transmitted thereto through an intermediary (not shown). Then when the loading ring 7 reaches the unload completion position, the unload completion detecting switch 101 is actuated by the projection 7b so that its output P1 changes from low to high level. As a result, one of the inputs of the NAND circuit 46 becomes low level, then the output of the NAND circuit 46 changes from low to high level, and then the control signal at the control terminal 44a of the drive control circuit 44 becomes low level. Since, at this time, the control signal supplied to the other control terminal 44b is of low level, the aforesaid drive control circuit 44 stops the motor 9 from rotating. That is, rotative movement of the loading rings 7 and 8 is stopped, and the unloading completion position illustrated in FIG. 1 is regained. In this position, as has been described above, the clutch changeover plate 27 is pushed again at the area 27b by the actuating projection 8a of the loading ring 8. It is noted that the tapered surface of the stopper portion 27c formed in the side wall of the actuating area 27b serves to guide the aforesaid actuating projection 8a onto the actuating area 27b smoothly.

As in the above, in the above described embodiment of the apparatus, the driving torque transferring mechanism for the idler 14 is constructed so that responsive to movement of the loading rings 7 and 8, the 1st operative position where the driving torque of the motor 18 is transferred directly to the idler 14 is changed over to the 2nd operative position where the driving torque of the motor 18 is transferred through the slip member 25 to the idler 14. This gives rise to an advantage that the driving of the reel table when in the ordinary fast forward, or fast rewind time, and the driving of the takeup side reel table when in the search mode can be selectively performed by the use of the same idler 14. Therefore, the reel table drive mechanism in the search mode-equipped magnetic recording and reproducing apparatus is made extremely simplified, and the operating member for the fast forward and fast rewind of the tape within the cassette can be made to also serve as an operating member for the search mode, thus giving an additional advantage that the structure of the control panel is also simplified.

It is noted that in the above-described embodiment of the apparatus the switching of the driving torque transfer mechanism is controlled by the use of the clutch disc 23 in combination with the clutch changeover plate 27 which the latter is arranged to be displaced in response to the movement of the loading ring 8. However, the present invention is not confined thereto. For example, as indicated by a dashed line block in FIG. 3, use may be made of a clutch solenoid as an actuator for the clutch changeover plate 27, and the operation of the clutch solenoid 58 is controlled in accordance with the output of the loading completion detecting switch 100. What is essential is in that the driving torque transfer mechanism of the invention is made switchable between the 1st and 2nd positions depending upon the loading state of the tape in order to insure that when in the search mode, either one of the reel tables 12 and 13 is driven with a proper winding torque by the idler 14. It is therefore to be understood that the foregoing description of the accompanying drawings are intended to be illustrative of the invention, and are not intended to be limiting since the practical structure may be modified in various ways.

Also, though the above embodiment of the apparatus has been described in connection with the cooperation of the idler 14 with the capstan motor 18 through the driving torque transfer mechanism in such a manner that only when in the search mode, the motor 18 is caused to rotate in the increased speed, it is preferred that as the idler 14 is made to be driven by the capstan motor 18, not only when in the search mode, but also when in the ordinary fast forward and fast rewind modes, the motor 18 is further speeded up. It is noted that the driving of the idler 14 may be carried out by a separate motor from the capstan motor 18.

As has been explained in greater detail, according to the present invention, it is made possible to realize a magnetic recording and reproducing apparatus capable of the search mode of which the structure is very simple as compared with the conventional one. Further, there is no need to increase the number of manual operating members than the ordinary fast forward and fast rewind control members, since one of them can be used as the control member for the search mode. Therefore, the bulk and size and weight of the magnetic recording and reproducing apparatus capable of the search mode can be minimized as compared with the conventional one, and the control panel also can be simplified as compared with the conventional one.

What is claimed is:

1. A video signal reproducing apparatus using a tape shaped recording medium, comprising:
    (a) a pair of rotation means for taking up the medium in respective different directions;
    (b) a head drum assembly having at least one rotating head and guiding the medium by the outer peripheral surface thereof;
    (c) loading means for moving between first and second positions, in which
    when said loading means is at said first position, the medium is on a first path where the medium is in fitting contact on the outer peripheral surface of said head drum assembly, and
    when said loading means is at said second position, a path of the medium is on a second path where the medium is out of contact with said head drum assembly;
    (d) driving means for driving at least one of the pair of rotation means;
    (e) moving means including a member movable between two positions where the medium can and cannot move respectively and having a first mode for moving the medium at a first speed and a second mode for moving the medium at a second speed faster than at the first speed;
    (f) detecting means for detecting the position of each loading means;
    (g) first manually operable means;
    (h) first control means, responsive to said first manually operable means, for causing said loading means to change the path of the medium between the first and second paths and for causing said movable member in said moving means to move between the positions where the medium can move and the medium cannot;
    (i) second manually operable means; and
    (j) second control means for changing said moving means between said first mode and said second mode when said detecting means detects that the medium is at the first position, and for controlling said driving means to change the moving speed of the medium to a third speed faster than the second speed when said detecting means detect that the loading means is at the second position.

2. An apparatus according to claim 1, wherein said moving means has a third mode for moving the medium at a fourth speed faster than said first speed in a direction contrary to the movement at said first speed and which further comprises third manually operable means for changing the moving means between said first mode and said third mode when the detecting means detects that the (medium is on) loading means is at the first path, and for controlling said driving means to change the moving speed of said medium between a zero speed and a fifth speed faster than the fourth speed in the same direction as the movement at the fourth speed when the detecting means does not detect that the medium is on the first path.

3. A video signal reproducing apparatus using a tape shaped recording medium comprising:
(a) a pair of rotation means for taking up the medium in respective different directions;
(b) moving means arranged to operate the medium between the pair of rotation means for moving the medium;
(c) driving means for driving at least one of the pair of rotation means;
(d) a head drum assembly including at least one rotating head for video signal reproduction and guiding the medium by an outer peripheral surface thereof;
(e) loading means for moving between a first and a second position, in which
when said loading means is at said first position, a path of the medium is on a first path where the medium is in fitting contact on the outer peripheral surface of said head drum assembly, and
when said loading means is at said second position, a path of the medium is on a second path where the medium is out of contact with said head drum assembly;
(f) detecting means for detecting the position of said loading means;
(g) first manually operable means for controlling movement of said loading means; and
(h) second manually operable means for changing the moving speed of the medium moved by said moving means between a first speed and a second speed faster than said first speed when the detecting means detects that said loading means is on the first position, and for changing the moving speed of said medium corresponding to the rotation of one of said pair of rotating means driven by said driving means to a third speed faster than said second speed when the detecting means does detect that said loading means is at the second position.

4. An apparatus according to claim 3, further comprising:
third manually operable means for changing the moving speed of the medium moved by said moving means between the first speed and a fourth speed faster than said first speed and reversing the moving direction of the medium when the detecting means detects that said loading means is at the first position, and for changing the moving speed of the medium corresponding to the rotation of one of said pair of rotation means driven by said driving means to a fifth speed faster than said fourth speed and in a direction contrary to said third speed when the detecting means detects that said loading means is at the second position.

5. An information signal reproducing apparatus using a tape shaped recording medium comprising:
(a) a pair of rotation means for taking up the medium in respectively different directions;
(b) reproducing means for reproducing the information signal from the medium;
(c) driving means for driving at least one of the pair of rotation means;
(d) moving means for operating the medium between the pair of rotation means for moving the medium;
(e) first manually operable means for changing over between determination of the moving speed of said medium by said driving means and determination of the moving speed of said medium by said moving means,
(f) second manually operable means capable of assuming a first condition and a second condition,
(g) third manually operable means capable of assuming a first condition and a second condition, so that when the moving speed of said medium is determined by said moving means through the operation of said first manually operable means, said moving means moves the medium at a first speed if said second manually operable means and the third manually operable means are in the first condition, and said moving means moves the medium at a second speed if one of said second manually operable means and said third manually operable means is in the second condition, and the direction of said movement is determined by whether said second manually operable means is in the second condition or said third manually operable means is in the second condition.

6. An information signal reproducing apparatus using a tape shaped recording medium comprising:
(a) reproducing means for reproducing the information signal from the medium;
(b) moving means including a member movable between two positions where the medium can and cannot move respectively and having a first mode for moving the medium at a first speed and a second mode for moving the medium at a second speed faster than at the first speed;
(c) first manually operable means capable of assuming a first condition and a second condition,
(d) second manually operable means capable of assuming a first condition and a second condition, so that when said moving means is at a position where the medium can move, said moving means assumes a first mode if said first manually operable means is in the first condition and said second manually operable means is in the first condition, and said moving means assumes a second mode if one of said first second manually operable means is in the second condition, and the direction of the movement of the medium is determined by whether said first manually operable means is in the second condition or said second manually operable means is in the second condition.

* * * * *